(12) United States Patent
Hirano et al.

(10) Patent No.: US 6,666,913 B2
(45) Date of Patent: Dec. 23, 2003

(54) AQUEOUS INK COMPOSITION

(75) Inventors: Norihiro Hirano, Osaka (JP);
Norimasa Kurihara, Osaka (JP);
Atsushi Sudo, Osaka (JP); Yasuyuki Yoshimura, Osaka (JP)

(73) Assignee: Sakura Color Products Corporation, Osaka (JP)

( * ) Notice: Subject to any disclaimer, the term of this patent is extended or adjusted under 35 U.S.C. 154(b) by 16 days.

(21) Appl. No.: 09/948,177

(22) Filed: Sep. 5, 2001

(65) Prior Publication Data

US 2003/0089271 A1 May 15, 2003

(30) Foreign Application Priority Data

Sep. 5, 2000 (JP) .......................................... 2000-269082
May 17, 2001 (JP) .......................................... 2001-147556

(51) Int. Cl.$^7$ .............................................. C09D 11/16
(52) U.S. Cl. ..................... 106/31.9; 106/31.6; 106/401; 106/404; 106/436; 106/447
(58) Field of Search ............................... 106/31.9, 31.6, 106/404, 436, 447, 401

(56) References Cited

U.S. PATENT DOCUMENTS

| 6,267,810 B1 | * | 7/2001 | Pfaff et al. ............. 106/415 |
| 6,517,628 B1 | * | 2/2003 | Pfaff et al. ............. 106/417 |
| 2002/0096083 A1 | * | 7/2002 | Spencer et al. ............. 106/31.9 |

FOREIGN PATENT DOCUMENTS

EP 0 960 916 A1 * 1/1999 ............ C09D/11/18

* cited by examiner

Primary Examiner—Mark L. Bell
Assistant Examiner—Veronica F. Faison
(74) Attorney, Agent, or Firm—Knobbe, Martens, Olson & Bear LLP

(57) ABSTRACT

The main object is to provide a water-based ink composition which is not only superior in hiding power but also has satisfactory writing properties. This invention relates to a water-based ink composition comprising a powder consisting of inorganic particles comprising at least one of aluminum oxide, titanium dioxide and boron nitride and water.

16 Claims, No Drawings

AQUEOUS INK COMPOSITION

FIELD OF THE INVENTION

The present invention relates to a water-based ink composition which is outstanding in writing properties and hiding power, among other characteristics.

BACKGROUND OF THE INVENTION

A variety of water-based inks has heretofore been developed and in use for markers, ball-point pens and felt pens. Water-based inks are required to have good hiding power in addition to satisfactory writing properties. When the hiding power is low, no sufficient density can be imparted to written images. The result is that writings are not sufficiently legible. On the other hand, if an excessive colorant is incorporated for enhanced opacity power, the ink will suffer from a decrease in dispersibility, affecting writing properties adversely as a consequence.

From the above point of view, many attempts have been made to have writing properties and hiding power reconciled in the ink.

Unexamined Japanese Patent Publication H8-231916 discloses a water-based white pigment ink for ball-point pen use which contains at least a titanium dioxide having an oil absorption capacity of not less than 30 (g/100 g), a titanium dioxide having an oil absorption capacity of less than 30 (g/100 g), a binder, a viscosity-building (thickener) water-soluble resin, and water, the pH of which ink is higher than the isoelectric point of the titanium dioxide having an oil absorption capacity of not less than 30 (g/100 g) and which has a viscosity of 6000~50000 centipoises (type E viscometer, st rotor, 1 rpm, 25° C.).

Unexamined Japanese Patent Publication H6-192611 discloses a water-based pigment ink composition for writing use characterized in that it comprises at least a composite powder having a mean particle diameter of 0.2–2 $\mu$m as obtained by depositing a micronized titanium dioxide having a mean particle diameter of not greater than 0.1 $\mu$m as a colorant on the surface of a resin powder.

Unexamined Japanese Patent Publication H6-287499 discloses a water-based white pigment ink for ball-point pen use which comprises a white pigment, a tabular silicate, a water-soluble resin, a water-soluble organic solvent, and water and has a viscosity of 6000~100000 cps (type-E viscometer, at rotor, 1 rpm, 25° C.).

Unexamined Japanese Patent Publication 2000-119579 discloses a water-based ink composition for ball-point pen use which comprises at least water, a thixotropic agent and, as colorant, a pearlescent pigment comprising a mica the surface of which has been covered with titanium dioxide in a thickness of 40~60 $\mu$m.

Unexamined Japanese Patent Publication 2000-129187 discloses.

Unexamined Japanese Patent Publication 2000-265125 discloses a water-based white ink composition for ball-point use which comprises a titanium dioxide-containing microencapsulated pigment, water, and a water-soluble organic solvent as essential components.

International Publication WO 98/36033 discloses a white pigment ink for water-based ball-point pen use which comprises titanium dioxide, a complementary colorant comprising a pigment or a pseudopigment obtainable by dying emulsion resin particles with a dyestuff, a resin emulsion having a mean particle diameter of not less than 200 nm, a thickener, water, and a polar solvent.

Unexamined Japanese Patent Publication H9-10435 discloses a water-based ink composition for ball-point use which essentially comprises a pigment or a colored resin emulsion, a dispersant, a water-soluble organic solvent, and water characterized in that said composition further contains a defined phosphoric ester.

Unexamined Japanese Patent Publication H9-227820 discloses a water-based ball-point ink composition characterized in that it comprises a colorant, water, a water-soluble polar solvent, and a fatty acid amide expressing a thixotropic action (e.g. oleic diethanolamide).

SUMMARY OF THE INVENTION

However, even those water-based inks have room for improvement in the aspect of reconciling writing properties and hiding or hiding power.

It is, therefore, a primary object of the present invention to provide a water-based ink composition improved in both hiding power and writing properties.

Means for Solving the Problems

As the result of their intensive research for overcoming the above-mentioned disadvantages of the prior art, the inventor of the present invention found that the above object can be accomplished by using an ink composition containing a defined inorganic powder and have ultimately developed the present invention.

The present invention, therefore, is directed to the following water-based ink compositions.

1. A water-based ink composition comprising a water and a powder consisting of inorganic particles comprising at least one of aluminum oxide, titanium dioxide, and boron nitride.
2. The water-based ink composition according to the above paragraph 1 wherein the inorganic particles 1) comprise titanium dioxide and have a surface conversion layer 2) contain Al, Si, Zn and Zr, and 3) have an Al/(Al+Si+Zn+Zr) weight ratio of not greater than 0.5,
said composition further comprising a water-soluble polymer.
3. The water-based ink composition according to the above paragraph 2, the water-soluble polymer content of which is 0.1~3 weight %.
4. The water-based ink composition according to the above paragraph 1 wherein the inorganic particles are scaly particles of at least one kind selected from the group consisting of scaly alumina particles and scaly boron nitride particles,
said composition further comprising a water-soluble polymer.
5. The water-based ink composition according to the above paragraph 4 not containing a colorant other than the scaly particles.
6. The water-based ink composition according to the above paragraph 1 wherein the inorganic particles are scaly alumina,
said composition further comprising a colorant, a water-soluble organic solvent, and a water-soluble polymer.
7. The water-based ink composition according to the above paragraph 6 wherein the aspect ratio of the scaly alumina is not less than 5.
8. The water-based ink composition according to the above paragraph 7 wherein the colorant comprises a colored resin bead dispersion.
9. The water-based ink composition according to the above paragraph 1 wherein the inorganic particles are comprised of a white scaly pigment.

10. The water-based ink composition according to the above paragraph 9 wherein the colorant is at least one white scaly pigment selected from the group consisting of boron nitride and alumina flakes.
11. The water-based ink composition according to the above paragraph 9 further comprising a water-soluble polymer and a water-soluble organic solvent.
12. A writing instrument comprising the water-based ink composition defined in the above paragraph 1 as its ink component.

In this specification, the invention defined in the above paragraph 1 is referred to as the "basic invention". The invention corresponding to the above paragraph 2 is referred to as the "first invention". The invention corresponding to the paragraph 4 is referred to as the "second invention". The invention corresponding to the paragraph 6 is referred to as the "third invention". The invention corresponding to the paragraph 9 is referred to as the "fourth invention".

DETAILED DESCRIPTION OF THE INVENTION

The basic invention according to the present invention relates to a water-based ink composition comprising a water and a powder consisting of inorganic particles which contain at least one of aluminum oxide, titanium dioxide, and boron nitride and water.

It is sufficient that said inorganic particles contain at least one of aluminum oxide, titanium dioxide, and boron nitride. For example, each particle may be either composed of aluminum oxide alone or composed of aluminum oxide and other ingredient or ingredients. The ingredients of such inorganic particles can be selectively used in the first through the fourth invention to be described hereinafter. Moreover, as to components other than said powder and water, the components used in known inks can be judiciously formulated according to each of the embodiments of the invention which are described in detail hereinafter. The first invention through the fourth invention are now described in the order mentioned.

(1) First Invention

The first invention is a composition comprising a powder consisting of inorganic particles 1) comprise titanium dioxide and have a surface conversion layer, 2) contain Al, Si, Zn and Sr, and 3) have an Al/(Al+Si+Zn+Zr) weight ratio of not greater than 0.5,
said composition further comprising a water-soluble polymer.

The particles mentioned above can be prepared by treating titanium dioxide with a surface conversion reagent containing at least one of aluminum, silicon, zinc and zirconium.

The kind of said titanium dioxide ($TiO_2$) is not restricted but any of the hitherto-known species and commercial products can be employed. Referring to crystal structure, it may be whichever of rutile and anatase crystals. Thus, by way of trade names, there can be mentioned "Tipaque R-830", "Tipaque R-850", "Tipaque R-820", Tipaque R-930", Tipaque R-780", Tipaque R-780-2" (all are products of Ishihara Sangyo Kaisha Ltd.), "KR-380N", "KR-480" (both are products of Titanium Industry), and "JR-701", "JR-806", "JR-800", "JR-801", "JR-805", "JR-603" (all are products of Tayca), among others.

As the surface conversion reagent, oxides and/or phosphates of said respective elements can be generally used. Specifically, aluminum oxide, silicon dioxide, zinc oxide, zirconium dioxide, zirconium phosphate, etc. can be mentioned. These surface conversion reagent compounds can be used each independently or in a combination of two or more species. Furthermore, the surface conversion reagent may contain other inorganic oxides. The elements of Al, Si, Zn and Zr applied in such surface conversion treatment are preferably present in the form of $Al_2O_3$, $SiO_2$, $ZnO_2$ and $ZrO_2$, respectively, on the surface of titanium dioxide particles. These oxides contribute to better interactions with the water-soluble polymer and, hence, an improved dispersion stability. Particularly with Zn and Zr, hence $ZnO_2$ and $ZrO_2$, greater weather resistance, too, can be obtained.

The weight ratio of these ingredients, namely Al/(Al+Si+Zn+Zr), is not more than 0.5. If the above weight ratio exceeds 5, the viscosity of the water-based ink will be elevated with time so that the viscosity stability tends to deteriorate.

The titanium dioxide content may be generally about 1~60 weight %, preferably 5~55 weight %, based on the total water-based ink composition. Within this range, particularly favorable writing properties, hiding power and color development can be achieved.

The water-soluble polymer is not particularly restricted insofar as it may thicken the ink or cause gelation in the ink. Examples of the water-soluble polymers include polysaccharides and their derivatives, semisynthetic cellulosic polymers, synthetic water-soluble polymers, or the like. These may be used each independently or in a combination of two or more species.

The polysaacharides are preferably native (naturally-occurring) polysaccharides. As native polysaccharides, there can be mentioned polysaccharides of the microbial origin, such as pullulan, xanthan gum, welan gum, rhamsan gum, succinoglycan, dextrin, etc., inclusive of their derivatives; water-soluble polysaccharides of the vegetable origin, such as tragacanth gum, guar gum, tara gum, locust bean gum, ghatti gum, arabinogalactan gum, arabic gum, cress seed gum, pectin, starch, psyllium gum, carrageenan, alginic acid, agar, etc., inclusive of their derivatives; and water-soluble polysaccharides of the animal origin, such as gelatin, casein, albumin, etc. inclusive of their derivatives. These can be used each independently or in a combination of two or more species. Commercial versions of these polysaccharides may also be employed.

Examples of said semisynthetic cellulosic polymers include methylcellulose, hydroxyethylcellulose, hydroxypropylcellulose, hydroxypropylmethylcellulose, hydroxypropylethylcellulose, carboxymethylcellulose and its salt (e.g. sodium salt), among others.

Examples of said water-soluble synthetic polymers include polyvinylpyrrolidone, polyethylene oxide, polyacrylic acid, methyl vinyl ether-maleic anhydride copolymer, and so forth.

The water-soluble polymer content of the water-based ink composition according to the first invention should be selected with reference to the kind of water-soluble polymer to be used but may for example be generally about 0.1~3 weight %, preferably 0.2~2 weight %. Within this range, the proper ink viscosity can be maintained with greater certainty and, hence, satisfactory writing properties can be insured.

In the first invention, said water may for example be deionized water or distilled water. The water content is not particularly restricted but may for example be generally about 1~98.9 weight %, preferably 37~95 weight %.

In addition to the above-mentioned components, the water-based ink composition of the first invention may contain a water-soluble organic solvent, a colorant, a bead resin, a dispersant and other known additives.

The water-soluble organic solvent is not particularly restricted insofar as it prevents drying of the ink, therefore, various known or commercial solvents can be employed. For example, glycols such as ethylene glycol, diethylene glycol, triethylene glycol, propylene glycol, polyethylene glycol, glycerin, etc. and glycol ethers such as ethylene glycol monomethyl ether, diethylene glycol monomethyl ether, etc. can be mentioned. These can be used each independently or in a combination of two or more species.

The formulating level of the water-soluble organic solvent is not particularly limited but may for example be generally about 1~40 weight %, preferably 1~15 weight %, based on the total water-based ink composition. Within this range, the uniformity of the ink composition can be more effectively insured while the proper speed of drying of writings (ink films) is maintained with greater certainty.

The colorant or coloring matter is not particularly restricted so long as it is well dispersible or soluble in the water-based ink composition and, as such, can be judiciously selected from among the known colorants. Moreover, the colorant may or may not be water-soluble. The colorant which can be used includes not only various pigments such as inorganic pigments, organic pigments, fluorescent pigments, etc. and various dyes such as direct dyes, acid dyes, basic dyes, etc. but also pigmented or dyed plastic extenders, colored emulsions and so forth. The preferred colorant is a pigment. As the pigments, there can be mentioned inorganic pigments inclusive of carbon black and organic pigments such as copper-phthalocyanine pigments, threne pigments, azo pigments, quinacridone pigments, anthraquinone pigments, dioxane pigments, indigo pigments, thioindigo pigments, perinone pigments, perylene pigments, indolenone pigments, azomethine pigments and so forth. Aside from the above-mentioned pigments, metallic powder pigments and scaly pigments, such as glass flake pigments, aluminum powder pigments, metal-coated inorganic pigments, and pearlescent pigments can also be employed. As the colorant, pigment dispersions as dispersed with a pigment dispersant or a surfactant can also be employed.

The formulation level of the colorant may be judiciously selected according to the kind of colorant, other components used, etc. but may for example be generally about 0.05~15 weight %, preferably 1~10 weight %, based on the total weight of the water-based ink composition. Within this range, still superior writing properties, color development, etc. can be obtained.

The bead resin can be used for the purpose of reducing the average specific gravity of ink solids and enhancing the hiding power. The morphology of said bead resin is not particularly restricted but may for example be spherical, formless, hollow or tabular. The raw material includes but is not limited to polyethylene, polypropylene, polyvinyl chloride, polymethacrylate resin, benzoguanamine resin, nylon or the like. Moreover, those resins precolored with a dye or the like may also be used. Furthermore, these bead resins may be those available from commercial sources. As such commercial products, there can be mentioned "MP-1" (product of Soken Kagaku, polymethyl methacrylate), "Eposter-S" (product of Nippon Shokubai Chemical Co., melamine-formaldehyde condensate), "Nylon SP" (product of Toray Industries, Inc., nylon), "Vinyl Chloride #121" (product of Nippon Zeon Co., polyvinyl chloride), "MH5055" (product of Nippon Zeon Co., solid content 30%), "SX863" (product of Japan Synthetic Rubber Co., solid content 20%), "SX864(B)" (product of Japan Synthetic Rubber Co., solid content 40%), "SX865(B)" (product of Japan Synthetic Rubber Co., solid content 48%). "Lowpaque OP-62" (product of Rohm & Haas Japan, solids 42.5%), "Lowpaque OP-84J" (product of Rohm & Haas Japan, solid content 37.5%), "LowPaque OP-91" (product of Rohm & Haas Japan, solid content 37.5%), among others. In addition, there may also be mentioned "Muticle PP120" and "Muticle 240D" (both are products of Mitsui Toatsu Chemicals, Inc.), "Voncoat PP-2000S", "Voncoat PP-1000", "Voncoat PP-1001", and "Voncoat PP-1100" (all are products of Dainippon Ink and Chemicals, Inc.), among others. These bead resins can be used each independently or in a combination of two or more species.

The dispersant is not particularly restricted but is preferably at least one member selected from among water-soluble resins and surfactants. The water-soluble resins may be whichever of native resins, semisynthetic resins and synthetic resins, although synthetic resins are preferred in consideration of the problems associated with mold growth and putrefaction and the rheological characteristics required of any water-based ink composition. The synthetic resin (synthetic water-soluble resin) includes, for instance, acrylic resins, maleic acid resin, styrene resin, styrene-acrylic resin, styrene-maleic acid resin, polyvinylpyrrolidone, polyvinylalcohol, ester-acrylic resins, ethylene-maleic acid copolymer, polyethylene oxide, urethane resin, and so forth. Resin emulsions can also be used as said water-soluble resin. For example, acrylic emulsions, vinyl acetate emulsions, urethane emulsions, styrene-butadiene emulsions, etc. can be mentioned. The surfactant can be judiciously selected from among anionic, cationic, nonionic, and amphoterio surfactants. Of all of such dispersants, water-soluble resins are most preferred.

The formulating level of the dispersant should vary with different kinds of dispersants but may for example be generally about 0.1~20 weight %, preferably 0.5~15 weigth %, based on the total water-based ink composition. Within this range, a better dispersion stability can be obtained.

As other additives which can be formulated, there can be mentioned rust preventives such as benzotriazole, tolyltriazole, dicyclohexylammonium nitrate, etc., antifungal agents/preservatives such as benzoisothiazolines, pentachlorophenols, cresol compounds, and so forth. Furthermore, wetting agents, defoamers, leveling agents, antiflocculants, pH control agents, and thixotropic agents may also be mentioned.

The water-based ink composition of the first invention can be produced by admixing these components evenly. A typical procedure may comprise adding and dispersing titanium dioxide in a suitable amount of a water-soluble organic solvent and/or water to prepare a titanium dioxide dispersion, optionally adding said bead resin, then adding said water-soluble polymer, water-soluble organic solvent and/or water, optionally adding said dispersant and other additives, and finally, mixing the whole evenly to give the objective water-based ink composition. The colorant may be added in an early stage, that is to say at the preparation of said titanium dioxide dispersion. In the production of the ink composition of the invention, such known procedures as dispersing, defoaming, filtering, etc. can be utilized.

The writing instrument of this invention utilizes the water-based ink composition of the first invention as its component ink and, as to the other components, the known structural members can be employed. The type of writing instrument is not particularly restricted, but the invention is applicable to all types of writing instruments such as markers, felt pens, ball-point pens and so forth. Among these instruments, ball-point pens and ink-free sign pens or markers are suited and ball-point pens are most suitable. Thus, the composition of the invention can be used with advantage as a water-based ink composition for ball-point pan use.

The method of assembling may also be carried out using assembling methods of the known writing instrument. Taking a ball-point pen as an example, the ink composition of the invention is filled into an ink housing, e.g. a hollow polypropylene shaft equipped with a stainless steel ball-point-pen tip (the ball is made of a non-oxide ceramic material such as silicon carbide) at one end, and this filled housing is accommodated into a ball-point pen body, whereby the objective ball-point pen can be obtained.

(2) Second Invention

The second invention is directed to a water-based ink composition wherein the inorganic particles are scaly particles of at least one kind selected from among scaly alumina particles and scaly boron nitride particles and which further contains a water-soluble polymer.

The scaly particles may be colored (colored scaly particles) or uncolored (scaly particles not colored). Moreover, in this invention, colored particles and uncolored particles may be used in combination.

The mean diameter of scaly particles is not particularly limited but may for example be generally about 0.6~10 μm in diameter, preferably 1~10 μm, more preferably 2–10 μm.

The scaly particles are not particularly restricted in material but the known or commercial scaly (or scale-like) pigments can be employed. Examples of scaly particles include scaly aluminum particles, scaly alumina particles and scaly boron nitride particles, or the like. In this invention, at least one of scaly alumina and scaly boron nitride can be used with particular advantage.

The scaly alumina particles as such are known and commercial products can also be used. As such commercial products, "Seraf YFA 02025", "Seraf YFA 10030", "Seraf YFA 05025" (all are products of YKK), "Teraces BMM", "Teraces BMF", "Teraces BMN", "Teraces BMP", "Teraces BMI", "Teraces BMM-B", "Teraces BMF-B", "Teraces BMN-B", "Teraces BMP-B", and "Teraces BMI-B" (all are products of Kawai Lime Industry) can be used with advantage.

The scaly boron nitride particles as such are known, and commercial products may be employed. As such commercial products, "Sho BN UHP-1", "Sho BN UHP-S1" (both are products of Showa Denko K.K.), "Denka Boron Nitride Light SP-2", "Denka Boron Nitride HGP", "Denka Boron Nitride GP", and "Denka Boron Nitride SGP" (all are products of Denki Kagaku Kogyo Kabushiki Kaisha) can be used with advantage.

The formulating level of the scaly particles may be freely selected according to the kind of particles to be used but may for example be generally about 0.5~50 weight %, preferably 3~20 weight %, based on the total composition of the invention.

The water-soluble polymer is not particularly restricted insofar as it has the property to reduce the viscosity of the ink composition to make it fluid when the composition is subjected to a shear stress (pseudoplasticity or thixotropy) but can be judiciously selected with reference to the kind of solvent used, in particular.

In the case of an aqueous solvent (hydrous solvent), at least one member selected from among polysaccharides and derivatives thereof can be used with advantage. As such polysaccharides and derivatives, there can be mentioned various polysaccharides of the microbial origin, such as pullulan, xanthan gum, welan gum, rhamsan gum, succinoglycan, detrixin, etc., inclusive of their derivatives; water-soluble polysaccharides of the vegetable origin, such as tragacanth gum, guar gum, tara gum, locust bean gum, ghatti gum, arabinogalactan gum, arabic gum, cress seed gum, pectin, starch, psyllium gum, carrageenan, alginic acid, agar, etc., inclusive of their derivatives; and water-soluble polysaccharides of the animal origin, such as gelatin, casein, albumin, etc., inclusive of their derivatives. These can be used each independently or in a combination of two or more species. Commercial versions of these polysaccharides may also be used. Among the various thixotropic agents mentioned above, polysaccharides of the microbial origin, inclusive of derivatives thereof, are preferred.

In the case of an oily solvent (non-aqueous solvent), at least one non-pigment type gelling agent can be used with advantage. The non-pigment type gelling agent includes but is not limited to metal soaps such as aluminum soap, sorbitol derivatives such as dibenzylidenesorbitol or the like. Other examples of the agent include alkylglutaminamides, fatty acid amides, oxidized polyethylene waxes, dextran fatty acid esters, hydrogenated castor oil, 12-hydroxystearic acid, and polyetherester surfactant type gelling agents, or the like. These can be used each independently or in a combination of two or more species. Commercial versions thereof may also be used. Among these thixotropic agents, metal soaps are particularly preferred.

The level of the water-soluble polymer in the ink composition is about 0.01~20 weight %, and can be judiciously selected within the above range according to the kinds of thixotropic agent and solvent used, among other variables. Particularly when at least one of said polysaccharides and derivatives thereof is employed, the preferred level of the water-soluble polymer is 0.01~5 weight %, more preferably 0.03~3 weight %. Furthermore, particularly when at least one kind of said non-pigment type gelling agent is used, the preferred level is 0.01~20 weight %, with the range of 0.2~10 weight % being particularly preferred.

In this invention, the solvent may be whichever of the aqueous and the nonaqueous solvent. Thus, as the solvent, there may be employed not only water but also organic solvents, e.g. alcohols such as ethyl alcohol, isopropyl alcohol, benzyl alcohol, etc.; aromatic hydrocarbons such as toluene, xylene, etc.; aliphatic hydrocarbons such as methylcyclohexane etc.; ketones such as methyl ethyl ketone, methyl isobutyl ketone, isophorone, etc.; esters such as ethyl acetate, butyl acetate, etc.; and ether alcohols such as cellosolve, butyl-cellosolve, propylene glycol, and so forth. In the case of an aqueous solvent, it may be water alone or a combination of water with an organic solvent (water-soluble organic solvent). In the case of a nonaqueous solvent, at least one kind of organic solvent can be employed.

The formulating level of the solvent may be the balance after exclusion of said essential components and optional additives which are described hereinafter.

In this invention, a variety of additives can be formulated within the range not interfering with expression of the effect of the invention. For example, surfactants, rust inhibitors, preservatives/antifungal agents, and humectants (antidrying agents) can be used. In the ink composition according to this second invention, it is preferable to avoid formulating a resinous binder which is used in the known erasable ink composition.

The method of producing the water-based ink composition of the second invention is not particularly restricted insofar as said various components can be evenly admixed. The order of formulating them is not restricted, either. A typical procedure may comprise mixing said colored and/or uncolored scaly alumina particles and a portion of said solvent, optionally together with said additives, blending the mixture with a solution of said thixotropic agent in the remainder of the solvent, and stirring the whole mixture. Where necessary, the above procedure is followed by filtration, degassing and other steps to give the ink composition of the invention. The blending and stirring can be carried out using the known machine such as a mixer or a kneader. The filtration and degassing can also be carried out by the known methods.

The viscosity of the ink composition of this invention can be judiciously selected according to the type and intended use of writing instrument and other factors but may usually be about 500–10000 mPa's (ELD viscometer, 3* R14 cone, rotational speed 0.5 rpm, 20° C.).

The writing instrument of the invention utilizes the water-based ink composition of the invention as its ink component and can be implemented by using the known other component members. The type of writing instrument is not restricted but the invention can be embodied as any of marker, felt pen, ball-point pen and so forth. Particularly, the invention is suitable for ball-point pens and ink-free sign pens or markers and more suitable for ball-point pens. Thus, the composition of this invention can be used most advantageously as an erasable ink composition for ball-point pen use.

The method of assembling a writing instrument of this invention may also be carried out using assembling techniques that used for the known corresponding instrument. Taking a ball-point pen as an example, it can be assembled by filling the ink composition of the invention into an ink housing comprising a hollow polypropylene shaft equipped with a stainless steel ball-point-pen tip (the ball is made of a nonoxide ceramic material such as silicon carbide) at one end and accommodating the filled housing into a ball-point pen body.

(3) Third Invention

The third invention is directed to a water-based ink composition comprising scaly alumina as the inorganic particles and further containing a colorant, a water-soluble organic solvent, and a water-soluble polymer.

The scaly alumina is not particularly restricted insofar as they are scaly particles. The mean particle diameter of the flakes is not particularly limited, but is usually about 0.6~10 μm, preferably 1~10 μm, more preferably 2~10 μm. The mean particle diameter is the $D_{50}$ value as measured with a laser diffraction particle size distribution analyzer.

The aspect ratio (mean particle diameter/mean thickness) of scaly alumina usually need only be larger than 1 but is preferably not less than 5, more preferably not less than 10. There is no upper limit to the aspect ratio but the ratio may usually be about 50.

Furthermore, the scaly alumina may be uncolored (i.e. clear or white) or colored. The colored scaly alumina may be of any type, for example the one colored by adsorption of a dye or a spray-dried one.

As such scaly alumina, known species and commercial products can be used. For example, "Seraf YFA 02025", "Seraf YFA 10030", "Seraf YFA 05025" (all are products of YKK), "Teraces BMM", "Teraces BMF", "Teraces BMN", "Teraces BMP", "Teraces BMI", "Teraces BMM-B", "Teraces BMF-B", "Teraces BMN-B", "Teraces BMP-B", "Teraces BMI-B" (all are products of Kawai Lime Industry), and "BMM" (product of Terada Yakusen Kogyo Co.) can be used with advantage.

The formulating level of the scaly alumina may be freely selected according to the kind and particle size to be used but may for example be generally about 0.01~20 weight %, preferably 0.05~10 weight %, based on the total composition of the invention. Within this range, satisfactory ink fluidity, ink viscosity, etc. can be obtained, with the result that good writing properties can be insured with certainty.

The water-soluble polymer is not particularly restricted insofar as it reduces the viscosity of the ink composition to make it fluid when the composition is subjected to a shear stress (thixotropy) but can be judiciously selected with reference to the kind of solvent used, in particular.

In this invention, at least one member selected from among polysaccharides and derivatives thereof can be used with advantage. As such polysaccharides and derivatives, there can be mentioned various polysaccharides of the microbial origin, such as pullulan, xanthan gum, welan gum, rhamsan gum, succinoglycan, detrixin, etc., inclusive of their derivatives; water-soluble polysaccharides of the vegetable origin, such as tragacanth gum, guar gum, tara gum, locust beam gum, ghatti gum, arabinogalactan gum, arabic gum, cress seed gum, pectin, starch, psyllium gum, carrageenan, alginic acid, agar, etc., inclusive of their derivatives; and water-soluble polysaccharides of the animal origin, such as gelatin, casein, albumin, etc., inclusive of their derivatives. These can be used each independently or in a combination of two or more species. Furthermore, commercial products may also be used. Among such thixotropic agents, polysaccharides of the microbial origin, inclusive of derivatives thereof, are preferred.

The formulating level of the water-soluble polymer can be liberally selected within the above range according to the kind of water-soluble polymer and the kind of water-soluble organic solvent, among other variables, but may for example be generally about 0.01~30 weight %, preferably 0.05~20 weight %, based on the total water-based ink composition. When the formulating level is controlled within the above range, the ink viscosity can be controlled with greater accuracy and, at the same time, the dispersion stability of the scaly alumina, colorant, etc. can be further enhanced.

The water-soluble organic solvent is not particularly restricted but the known or commercial products can be used insofar as they are water-soluble. Thus, for example, glycols such as ethylene glycol, diethylene glycol, triethylene glycol, propylene glycol, polyethylene glycol, glycerin, etc.; and glycol ethers such as ethylene glycol monomethyl ether, diethylene glycol monomethyl ether, etc. can be mentioned. These can be used each independently or in a combination of two or more species.

The formulating level of the water-soluble organic solvent is not particularly restricted but may for example be generally about 1~40 weight %, preferably 5~20 weight %, based on the total ink composition of the invention. Within this range, the proper drying speed of the writings (ink films) can be positively maintained and the uniformity of the ink composition can be effectively insured.

The colorant is not particularly restricted but the known or commercial pigments and dyes can be used. For example, organic pigments such as phthalocyanine, quinacridone, etc.; inorganic pigments such as titanium white, carbon black, etc., and fluorescent pigments can be employed. Pigment dispersions can also be used and particularly colored bead resin dispersions (preferably a colored bead resin dispersion consisting of spherical particles) is preferably used. The mean particle diameter of such a colored bead resin is not restricted but may for example be generally about 0.2~20 μm. Therefore, satisfactory writing properties can be obtained even when the mean particle diameter is comparatively large, i.e. as large as about 3~20 μm.

The formulating level of the colorant in the ink composition of this invention can be liberally selected according to the kind of colorant, among other factors, but may for example be about 0.05~50 weight %, preferably 0.05~40 weight %. Within this range, better color development, ink fluidity, ink viscosity, etc. can be insured.

In this invention, a water-soluble resin can be added, where necessary. By adding a water-soluble resin, the fixation or trapping of the ink of the invention on a substrate can be improved. This water-soluble resin need only be soluble in water and resins equivalent to the water-soluble resins used in known water-based inks can be employed. The water soluble resins include, for example, acrylic resins, vinyl acetate resins, urethane resins, olefin resins, silicone resins, polyvinyl alcohol, polyvinylpyrrolidone, polyethylene oxide, latices, polycarboxylic acids, styrene-maleic acid copolymer, ethylene-vinyl acetate copolymer, or the like. These may be used each in the form of an emulsion or an aqueous dispersion as well. Those water-soluble resins can be used each independently or in a combination of two or more species.

The formulating level of the water-soluble resin (on a nonvolatile matter basis) can be judiciously selected according to the kind of water-soluble resin and other factors, but may for example be generally about 0.1~40 weight %, preferably 0.3~20 weight %, based on the total ink composition of the invention. Within this range, a further improved trapping effect, for instance, can be obtained.

In this invention, a variety of additives can be formulated without adversely affecting properties of the ink composition. For example, there can be used surfactants (e.g. nonionic surfactants such as polyoxyethylene nonylphenyl ether), rust inhibitors (e.g. benzotriazole, tolyltriazole, dicyclohexylammonium nitrate, etc.), and preservatives/ antifungal agents (e.g. benzoisothiazoline, pentachlorophenol, and cresol series compounds), among others.

The water content of the ink composition of this invention can be adjusted to constitute the balance after exclusion of said essential components and optional additives. Usually, the water content is controlled so that the solid content or nonvolatile fraction of the ink composition of the invention will account for about 0.01~5.00 weight percent.

The method of producing the ink composition of this invention is not particularly restricted insofar as said components can be uniformly admixed. The order of formulating them is not restricted, either. A typical procedure comprises blending water with said water-soluble organic solvent, scaly alumina and colorant under stirring, formulating said thixotropic agent, optionally together with said other additives, and stirring the whole mixture, optionally followed by pH adjustment, whereby the ink composition of the invention can be obtained. The blending and stirring can be effected by means of a known equipment such as a mixer or a kneader. Where necessary, filtration and degassing may also be performed according to the known protocols.

The viscosity of the ink composition of this invention may be judiciously selected according to the model or type and intended use of the water-based ball-point pen but may usually be about 1000~10000 mpa's (ELD viscometer, 3*R14 cone, rotational speed 0.5 rpm, 20° C.).

The third invention encompasses the invention directed to a water-based ball-point pen. This water-based ball-point pen utilizes the ink composition of this invention as its ink component but otherwise may be employed the known ball-point pen in construction.

The method of assembling the ball-point pen of this invention may also be carried out using techniques used for the known ball-point pen. A typical procedure comprises filling the ink composition of the invention into an ink housing comprising a hollow polypropylene shaft equipped with a stainless steel ball-point-pen tip (the ball is made of a nonoxide ceramic material such as silicon carbide) at one end and accommodating the filled housing into a ball-point pen body to complete the assembly.

(4) Fourth Invention

The fourth invention is directed to a water-based ink composition comprising a white scaly pigment as the inorganic particles.

The scaly pigment is not restricted but the known or commercial scaly pigments can be employed. The mean particle diameter of the scaly pigment is not restricted but may for example be generally about 0.6~10 μm, preferably 0.8~10 μm, more preferably 0.8~5 μm. The aspect ratio (major diameter/thickness) of the scaly pigment need only be larger than 1 and is preferably not less than 5, more preferably not less than 10. The scaly pigment can be used as a white pigment (white scaly pigment).

It is particularly preferable to use a scaly boron nitride and/or alumina pigment (the white pigment of this invention). These scaly pigments may also be known and/or commercial pigments. In the case of alumina, "Seraf YFA 02025", "Seraf YFA 02050", "Seraf YFA 10030", "Seraf YFA 05025" (all are products of YKK). "Teraces BMM", "Teraces BMF", "Teraces BMN", "Teraces BMP", "Teraces BMI", "Teraces BMM-B", "Teraces BMF-B", "Teraces BMN-B", "Teraces BMP-B", "Teraces BMI-B" (all are products of Kawai Lime Industry), and "BMM" (product of Terada Yakusen Kogyo) is preferably used.

In the case of boron nitride, "Denka Boron Nitride SP-2", "Denka Boron Nitride HGP", "Denka Boron Nitride GP", "Denka Boron Nitride SGP" (all are products of Denki Kagaku Kogyo Kabushiki Kaisha). "Sho BN UHP-1" and "Sho BN UHP-S1) (both are products of Showa Denko K.K.) can be used with advantage.

The formulating level of the scaly pigment can be judiciously selected according to the kind and particle diameter of the pigment but may for example be about 5~60 weight %, preferably 10~40 weight %, based on the total ink composition of the invention. Within this range, a potent hiding power can be obtained with greater certainty.

In this invention, white pigments other than boron nitride and alumina may also be formulated unless the properties of the ink composition is compromised thereby. Among such white pigments are known white pigments such as titanium dioxide, white resin beads (inclusive of white tabular resin beads, white hollow resin beads), talc, clay and mica.

The formulating level of such known white pigments may for example be generally not more than about 60 weight %, preferably 5~40 weight %, based on the total ink composition of the invention.

The total amount of white pigments (sum of the known white pigment and the white pigment of the invention) in this invention can be selected according to the kinds and particle diameters of white pigments to be used but may for example be generally about 5~60 weight %, preferably 10~40 weight %, based on the total ink composition of the invention.

The water content of the ink composition according to this invention may be judiciously selected according to the formulating amounts of other components but may for example be generally about 30~90 weight %, preferably 50~80 weight %.

In addition to the above components, the composition of this invention may contain such optional components as the colorant (exclusive of white pigments), water-soluble polymer, water-soluble organic solvent, surfactant, lubricant, preservative/antifungal agent, and rust inhibitor, among other additives. These may be the same additives as those formulated in known water-based inks.

Particularly in cases where said colorant is formulated, water-based inks having pastel shades such as cream, water blue, etc. can be obtained. The kind of colorant is not restricted but the known or commercial pigments and dyes can be used. For example, not only organic pigments, such as phthalocyanine, quinacridone, etc., and inorganic pigments, such an titanium white, carbon black, etc., but also fluorescent pigments can be employed. The formulating level of the colorant for this purpose may for example be about 0.01~20 weight %, preferably 0.1~15 weight %, based on the total ink composition of the invention.

The ink viscosity can be adjusted and the dispersibility of the pigment or colorant be also controlled by adding a water-soluble polymer. The water-soluble polymer is not particularly restricted insofar as it is soluble in water, thus including polysaccharides, derivatives thereof, semisynthetic cellulosic polymers, and synthetic water-soluble polymers, among others.

As such polysaccharides and derivatives, there can be mentioned polysaccharides of the microbial origin, such as pullulan, xanthan gum, welan gum, rhamsan gum, succinoglycan, dextrin, etc., inclusive of their derivatives; water-soluble polysaccharides of the vegetable origin, such as tragacanth gum, guar gum, tara gum, locust bean gum, ghatti gum, arabinogalactan gum, arabic gum, cress seed gum, pectin, starch, psyllium gum, carrageenan, alginic acid, agar, etc., inclusive of their derivatives; and water-soluble polysaccharides of the animal origin, such as gelatin, casein, albumin, etc., inclusive of their derivatives.

Examples of said semisynthetic cellulosic polymers include methylcellulose, hydroxyethylcellulose, hydroxypropylcellulose, hydroxypropylmethylcellulose, hydroxypropylethylcellulose, carboxymethylcellulose and its salt (e.g. sodium salt), among others.

The water-soluble synthetic polymer includes, for example, polyvinylpyrrolidone, polyethylene oxide, polyacrylic acid and methyl vinyl ether-maleic anhydride copolymer.

These water-soluble polymers can be used each independently or in a combination of two or more species. Commercial versions thereof may be used. Among these, microbial polysaccharides and polysaccharide derivatives are preferred. In the application of the composition of this invention to a ball-point pen, it is preferable to use a water-soluble polymer having the property to reduce the viscosity of the ink composition to make it fluid when the composition is subjected to a shear stress (pseudoplasticity or thixotropy). As the water-soluble polymer having said property, a polysaccharide or polysaccharide derivative of the microbial origin is preferred.

The water-soluble polymer content of the water-based ink composition should be selected with reference to the kind of water-soluble polymer to be used but may generally be about 0.01~20 weight %, preferably 0.05~5 weight %. Within this range, the proper ink viscosity, dispersibility, etc. can be maintained with greater certainty.

The water-soluble organic solvent is not restricted insofar as it is water-soluble, and the known or commercial solvents can be employed. For example, glycols such as ethylene glycol, diethylene glycol, triethylene glycol, propylene glycol, polyethylene glycol, glycerin, etc. and glycol ethers such as ethylene glycol monomethyl ether, diethylene glycol monomethyl ether, etc. can be mentioned. These can be used each independently or in a combination of two or more species.

The water-soluble organic solvent content of the water-based ink composition is not particularly restricted but may generally be about 0.1~30 weight %, preferably 1~15 weight %, based on the total composition. Within this range, the uniformity of the ink composition can be more effectively insured while the proper speed of drying of writings (ink films) is maintained with greater certainty.

The method of producing the water-based ink composition of the invention is not particularly restricted insofar as said various components can be evenly admixed. The order of formulating them is not restricted, either. A typical procedure may comprise mixing water with said white pigment, blending the resulting mixture with said other components, and stirring the whole. Where necessary, the above procedure is followed by pH adjustment and other steps to ultimately give the ink composition of the invention. The blending and stirring can be effected using the known equipment such as a mixer or a kneader. The filtration and degassing can also be achieved by the known protocols.

The viscosity of the ink composition of this invention can be judiciously selected according to the type of writing instrument, intended use thereof, and other factors but may usually be about 500~15000 mPa's (ELD viscometer, 3* R14 cone, rotational speed 0.5 rpm, 20° C.), preferably 1500~1000 mPa's.

The writing instrument according to the fourth invention utilizes the water-based ink composition of the fourth invention as its ink component and can be implemented by using the known other component members. The invention can be embodied as any of ball-point pen, marker, felt pen, and so forth. Particularly, the invention is suitable for ball-point pens.

Taking a ball-point pen as an example, the method of assembling a writing instrument of the invention may also be carried out using that used for the known corresponding instrument. It can be assembled, for example, by filling the ink composition of the invention into an ink housing comprising a hollow polypropylene shaft equipped with a stainless steel ball-point-pen tip (the ball is made of a nonoxide ceramic material such as silicon carbide) at one end and accommodating the filled housing into a ball-point pen body.

Effects of the Invention

The water-based ink composition according to the first invention contains a surface-treated titanium dioxide which contributes to a good dispersion stability and an improved viscosity stabilizing effect.

The water-based ink composition according to the second invention features a defined ink formulation including a scaly powder, which contributes not only to good writing properties and hiding power but also to a more satisfactory erasability as compared with the conventional erasable inks. Furthermore, it is excellent in ink stability (or holdout), effectively suppressing or inhibiting plugging of the pen (pen tip).

The water-based ball-point ink composition according to the third invention features a defined ink formulation including a scaly alumina and, as such, expresses better writing properties than the conventional lubricant-containing inks. Particularly, even when a precolored bead resin is used as a colorant or a resin having a comparatively large particle diameter is used, good writing properties can still be insured.

The water-based ink composition according to the fourth invention utilizes a scaly pigment for part or the whole of its white pigment so that, compared with the conventional water-based white ink, a greater hiding power can be realized while satisfactory writing properties are maintained. The composition of this invention, therefore, can be used with advantage as a white ink or a pastel color ink.

EXAMPLES

The following examples and comparative examples are intended to illustrate the features of the invention in greater clarity. It should, however, be understood that the scope of the invention is by no means limited to those examples.

Examples of First Invention

Preparation of an aqueous viscosity modifier solution

Xanthan gum (trade name "Kelzan", product of Sansho) was put in ion-exchanged water and stirred to give an aqueous viscosity modifier solution which is an aqueous solution of xanthan gum (xanthan gum content of the aqueous solution: 2 weight %).

Preparation of Water-Based Ink Compositions

Then, the water-based ink compositions according to Examples 1.1~1.4 and Comparative Examples 1.1~1.5 were prepared using the titanium dioxides indicated in Table 1-1. More particularly, the following methods were used.

Examples 1.2–1.4

Except that the titanium dioxides indicated in Table 1 were used, the procedure of Example 1.1 was otherwise repeated to give water-based ink compositions.

Comparative Examples 1.2–1.4

Except that the titanium dioxides indicated in Table 1-1 were used, the procedure of Example 1.1 was otherwise repeated to give water-based ink compositions.

Comparative Example 1.5

To a mixture of 10 weight parts of propylene glycol and 25 weight parts of deionized water were added 17 weight parts of a varnish (resin fraction: 20 weight %) prepared by neutralizing a styrene-acrylic resin (trade name "Johncryl J-679", product of Johnson Polymer) with sodium hydride and 50 weight parts of titanium dioxide followed by dispersing with a bead mill to prepare a titanium dioxide dispersion. Forty (40) weight parts of this titanium dioxide

TABLE 1-1

| | Titanium dioxide | | Compositional ratio (%) | | | | |
| --- | --- | --- | --- | --- | --- | --- | --- |
| | Trade name | Manufacturer | Ti | Al | Si | Zn | Zr | Al/(Al + Si + Zn + Zr) |
| Example 1.1 | Tipaque R-830 | Ishihara Sangyo | 95.4 | 1.3 | 0.3 | 1.6 | | 0.40 |
| Example 1.2 | Tipaque R-850 | Ishihara Sangyo | 95.1 | 1.6 | 1.6 | | 0.2 | 0.47 |
| Example 1.3 | KR-380N | Titanium Ind. | 95.5 | 1.1 | 0.4 | 1.4 | 0.1 | 0.36 |
| Example 1.4 | FR-47N | Furukawa Ind. | 96.0 | 1.0 | | | 1.9 | 0.35 |
| Compar. Ex. 1.1 | Tipaque R-580 | Ishihara Sangyo | 97.3 | 0.9 | 0.1 | 0.2 | 0.2 | 0.64 |
| Compar. Ex. 1.2 | Tipaque R-580 | Ishihara Sangyo | 97.7 | 0.8 | 0.1 | 0.2 | 0.2 | 0.64 |
| Compar. Ex. 1.3 | KR-460 | Titanium Ind. | 97.0 | 0.8 | | 0.4 | | 0.70 |
| Compar. Ex. 1.4 | KR-270 | Titanium Ind. | 95.6 | 1.6 | | 1.2 | | 0.57 |
| Compar. Ex. 1.5 | Tipaque R-830 | Ishihara Sangyo | 95.4 | 1.3 | 0.3 | 1.6 | | 0.40 |

Example 1.1

To a mixture of 10 weight parts of propylene glycol and 25 weight parts of deionized water were added 17 weight parts of a varnish (resin fraction: 20 weight %) prepared by neutralizing a styrene-acrylic resin (trade name "Johncryl J-679, product of Johnson Polymer) with sodium hydroxide and 50 weight parts of titanium dioxide followed by dispersing with a beads mill to give a titanium dioxide dispersion. Forty (40) weight parts of this titanium dioxide dispersion was mixed with 15 weight parts of said aqueous viscosity modifier solution and 45 weight parts of deionized water to prepare a white-colored water-based ink composition.

dispersion was mixed with 45 weight parts of deionized water to give a white-colored water-based ink composition.

Test Example 1.1

For each of the water-based ink compositions obtained in the above Examples and Comparative Examples, a viscosity stability test for evaluating the constancy of viscosity was performed and the amount of change in viscosity and the percent change in viscosity were calculated. For the evaluation of dispersion stability, a dispersion stability test was carried out and the degree of pigment settlement and hard cake formation was visually evaluated. The results are presented in Table 1-2. The viscosity and the amount of change in viscosity of the ink are both expressed in mPa's and the value of percent change in viscosity is expressed in %.

TABLE 1-2

| | Ink viscosity | | Change in viscosity | | Percent change in viscosity | | Dispersion |
| --- | --- | --- | --- | --- | --- | --- | --- |
| | Initial | 50° C. × 3 days | Value | Evaluation | Value | Evaluation | stability |
| Example 1.1 | 4289 | 4812 | 523 | ○ | 1.1 | ○ | ○ |
| Example 1.2 | 1995 | 2437 | 442 | ○ | 1.2 | ○ | ○ |
| Example 1.3 | 2699 | 2934 | 235 | ○ | 1.1 | ○ | ○ |
| Example 1.4 | 2699 | 3873 | 1174 | ○ | 1.4 | ○ | ○ |
| Compar. Ex. 1.1 | 3169 | 6044 | 2875 | X | 1.9 | X | ○ |
| Compar. Ex. 1.2 | 2347 | 5633 | 3286 | X | 2.4 | X | ○ |
| Compar. Ex. 1.3 | 2582 | 7863 | 5281 | X | 3.0 | X | ○ |
| Compar. Ex. 1.4 | 3873 | 6924 | 3051 | X | 1.8 | X | ○ |
| Compar. Ex. 1.5 | 50 | 50 | 0 | ○ | 1.0 | ○ | X |

Each test was performed according to the following protocol.

Viscosity Stability Test

The ink viscosity immediately after production of each water-based ink composition (initial viscosity) was measured. Then, the water-based ink composition was put in a polypropylene vessel, which was then closed tight, and after 3 days of storage at 50° C., the ink viscosity was measured again (post-storage ink viscosity). Based on the measured values of initial ink viscosity and post-storage ink viscosity, the amount of change in viscosity and the percent change in viscosity were calculated by means of the following equations, respectively. The values thus obtained were evaluated according to the criteria which are also shown hereunder. The viscosity measurements were made with an ELD viscometer under the following conditions: cone: 3*×R14 cone, rotational speed: 0.5 rpm, temperature: 20° C.

Amount of change in viscosity=initial ink viscosity−post-storage ink viscosity

○: change in viscosity<2000
x: change in viscosity≧2000
Percent change in viscosity=(post-storage ink viscosity/initial ink viscosity)×100
○: percent change in viscosity<1.5
x: percent change in viscosity≧1.5

Dispersion Stability Test

Each water-based ink composition was put in a polypropylene vessel, which was then closed tight, and the condition of the ink in the vessel after 6 months of storage at room temperature was visually examined. The evaluation was made according to the following criteria.

○: neither pigment settlement nor hard cake formation in the ink is observed.
x: both pigment settlement and hard cake formation are observed.

It is apparent from Table 1-2 that all the compositions according to Examples show only minor amounts of change and percent changes in viscosity and are satisfactory in dispersion stability. In contrast, the compositions according to Comparative Examples 1.1~1.4 invariably show large amounts of change and percent changes in viscosity and the composition of Comparative Example 1.5 is poor in dispersion stability.

Examples of Second Invention

Examples 2.1~2.3 and Comparative Examples 2.1~2.3

The components indicated in Table 2-1 were uniformly dispersed by stirring, filtered, and degassed to give ink compositions (water-based ink compositions).

TABLE 2-1

|   |                              | Ex. 2.1 | Ex. 2.2 | Ex. 2.3 | Compar. Ex. 2.1 | Compar. Ex. 2.2 | Compar. Ex. 2.3 |
|---|------------------------------|---------|---------|---------|-----------------|-----------------|-----------------|
| 1 | Scaly powder                 | 5       |         |         |                 |                 |                 |
| 2 | Scaly powder                 |         | 10      |         |                 |                 |                 |
| 3 | Scaly powder                 |         |         | 10      |                 |                 |                 |
| 4 | Succinoglycan                | 0.3     | 0.3     |         | 0.3             |                 |                 |
| 5 | Xanthan gum                  |         |         | 0.3     |                 | 0.3             |                 |
| 6 | Antifungal preservative      | 0.1     | 0.1     | 0.1     | 0.1             | 0.1             | 0.1             |
| 7 | Rust inhibitor               | 0.1     | 0.1     | 0.1     | 0.1             | 0.1             | 0.1             |
| 8 | Lubricant                    | 1.2     | 1.2     | 1.2     | 1.2             | 1.2             | 1.2             |
| 9 | Glycerin                     | 5       | 5       | 5       | 5               | 5               | 5               |
| 10 | Polyethylene oxide          |         |         |         |                 | 2               |                 |
| 11 | Styrene-butadiene rubber    |         |         |         |                 |                 | 25              |
| 12 | Water                       | 88.3    | 83.3    | 83.3    | 73.3            | 61.3            | 38.6            |
| 13 | Water-based white pigment dispersion |  |  |  | 20              |                 |                 |
| 14 | Water-based black pigment dispersion |  |  |  |                 | 30              | 30              |

Note) Unit: weight %
1 ... trade name "Seraf YFA02025, product of YKK, mean particle dia. 2.5 μm
2 ... trade name "Seraf YAF10030, product of YKK, mean particle dia. 10 im
3 ... trade name "Teraces BMN, product of Kawai Lime Ind. Co., mean particle dia. 3.1 μm
4 ... trade name "Rheozan", product of Sansho
5 ... trade name "Kelzan". product of Sansho
6 ... trade name "Proxcel GXL, product of Koechst Gosei, 1,2-benzoisothiazolin-3-on
7 ... benzotriazole
8 ... maleamic acid
10 ... molecular weight $60 \times 10^4 \sim 100 \times 10^4$
11 ... trade name "JSR0561", product of JSR Co.
13 ... titanium dioxide 50 wt. %, sodium naphthalenesulfonate-formaldehyde condensate 0.5 wt. %, and water 49.5 wt. %
14 ... carbon black (P.BLACK7) 10 wt. %, sodium naphthalenesulfonate-formaldehyde condensate 0.5 wt. %, and water 89.5 wt. %

Examples 2.4~2.5 and Comparative Example 2.4

The components indicated in Table 2-2 were uniformly dispersed by stirring, filtered, and degassed to prepare ink compositions (oil-based ink compositions).

TABLE 2-2

|   | Example 2.4 | Example 2.5 | Compar. Ex. 2.4 |
|---|---|---|---|
| 1 Scaly powder | 10 |  |  |
| 2 Scaly powder |  | 10 |  |
| 4 Aluminum soap | 2.5 | 2.5 | 2.5 |
| 5 Surfactant | 1.5 | 1.5 | 1.5 |
| 6 Ethyl alcohol | 9 | 9 | 9 |
| 7 Methylcyclohexane | 77 | 77 | 77 |
| 8 Titanium dioxide |  |  | 10 |

Note) Unit: weight %
1 . . . trade name "Seraf YFA02025", product of YKK, mean particle dia. 5 μm
2 . . . trade name "Teraces BMN", product of Kawai Lime Ind. Co., mean particle dia. 4.1 μm
3 . . . trade name "8% Octope", product of Hope Pharmaceutical Co., aluminum 2-ethylhexanoate
4 . . . trade name "Rheodol SP-L10", product of Kao Corporation, sorbitan monolaurate Example 2.6

Except that 5 weight parts of scaly boron nitride powder (trade name "Sho BN UHP-S1", product of Showa Denko K.K., mean particle dia. 1~2 μm) was used in lieu of 5 weight parts of "Seraf" as the scaly powder, the procedure of Example 1.1 was otherwise repeated to prepare a water-based ink composition.

Test Example 2.1

The erasability of each of the ink compositions obtained in Examples and Comparative Examples was examined.

First, a ball-point pen was assembled using each composition. Thus, the ink composition was filled into the ink housing comprising a hollow translucent polypropylene shaft equipped with a stainless steel ball-point-pen tip (ball: silicon carbide) at one end to complete a ball-point pen.

Using this ball-point pen, a line was drawn on black drawing paper. After 10 minutes, the drawn line was rubbed out with a commercial rubber eraser under the usual pressure and the degree of erasure of the drawn line was visually examined. The case in which the drawn line could be erased almost completely was rated "○", while the case in which the drawn line remained visible was rated "x". The results are shown in Table 2-3.

Furthermore, in order to evaluate the stability (preservation) of each ink composition, the ball-point pen assembled was allowed to stand with the pen tip down for one week to see whether writing was still possible or not. The case in which writing was possible was rated "○", while the case in which writing was impossible was rated "x". The results are shown in Table 2-3.

TABLE 2-3

|   | Erasability | Stability |
|---|---|---|
| Example 2.1 | ○ | ○ |
| Example 2.2 | ○ | ○ |
| Example 2.3 | ○ | ○ |
| Example 2.4 | ○ | ○ |
| Example 2.5 | ○ | ○ |
| Example 2.6 | ○ | ○ |
| Compar. Ex. 2.1 | ○ | X |
| Compar. Ex. 2.2 | X | ○ |
| Compar. Ex. 2.3 | X | ○ |
| Compar. Ex. 2.4 | X | ○ |

It was confirmed that the ink compositions of the invention (Examples 2.1~2.6) were excellent in both erasability and stability. Particularly in regard to erasability, even the line drawn under a high tip pressure could be easily erased, indicating that these ink compositions are very suitable for to ball-point pen use as well.

Examples of Third Invention

Examples 3.1–3.5 and Comparative Examples 3.1–3.4

According to the formulation shown in Table 3-1, water and the water-soluble organic solvent, lubricant and colorant were first admired and dispersed and the water-soluble resin and thixotropic agent were then added and stirred to give a uniform dispersion. This dispersion was filtered and degassed to give ink compositions (water-based ink compositions).

TABLE 3-1

|   |   | Example 3.1 | Example 3.2 | Example 3.3 | Example 3.4 | Example 3.5 | Compar. Ex. 3.1 | Compar. Ex. 3.2 | Compar. Ex. 3.3 | Compar. Ex. 3.4 |
|---|---|---|---|---|---|---|---|---|---|---|
| Scaly pigment | 1 | 4.00 | 4.00 |  | 3.00 |  |  |  |  |  |
|  | 2 |  |  | 3.00 |  | 2.00 |  |  |  |  |
| Colorant | 1 | 25.00 | 25.00 | 25.00 |  |  | 25.00 |  | 25.00 | 25.00 |
|  | 2 |  |  |  | 20.00 | 20.00 |  | 20.00 |  |  |
| Water-soluble thickener resin | 1 | 0.30 | 0.25 |  |  |  | 0.25 |  | 0.25 | 0.25 |
|  | 2 |  |  | 0.30 | 0.35 |  |  | 0.35 |  |  |
| Lubricant | 1 |  |  |  |  |  |  |  | 0.10 | 0.20 |
| Water-soluble resin | 1 |  | 15.00 |  |  | 15.00 | 15.00 |  | 15.00 | 15.00 |
|  | 2 |  |  | 3.00 | 3.00 |  |  | 3.00 |  |  |
| Water-soluble organic solvent | 1 | 5.00 | 5.00 | 5.00 | 5.00 | 5.00 | 5.00 | 5.00 | 5.00 | 5.00 |
|  | 2 | 10.00 | 10.00 | 10.00 | 10.00 | 10.00 | 10.00 | 10.00 | 10.00 | 10.00 |
| Antifungal preservative | 1 | 0.40 | 0.40 | 0.40 | 0.40 | 0.40 | 0.40 | 0.40 | 0.40 | 0.40 |
| Rust inhibitor | 1 | 0.80 | 0.80 | 0.80 | 0.80 | 0.80 | 0.80 | 0.80 | 0.80 | 0.80 |
| Water |  | 54.50 | 39.55 | 52.50 | 57.45 | 46.80 | 43.55 | 60.45 | 43.45 | 43.35 |
| Total |  | 100.00 | 100.00 | 100.00 | 100.00 | 100.00 | 100.00 | 100.00 | 100.00 | 100.00 |
| Writing properties |  | ○ | ○ | ○ | ○ | ○ | X | X | X | X |

As the components indicated in Table 3-1, the following products were used.
(1) Lubricating Agent or Smooth Agent
① α-Alumina powder: trade name "Seraf YFA02025", product of YKK, mean particle dia. 1~2 µm, aspect ratio 45~55
② γ-Alumina powder: trade name "BMM", product of Terada Yakusen Kogyo, mean particle dia. 0.9 µm, aspect ratio 10
(2) Colorant
① The blue resin bead dispersion prepared by the following method The blue resin beads (product of Soken Kagaku; resin: acrylic resin, dye: Sudan Blue 8) were put in a Disper, diluted with deionized water, and stirred for 3 hours. The resulting dispersion was centrifugally classified to give a paste with a particle diameter of 3~4 µm and a nonvolatile fraction of about 60 weight %. This paste was used as the colorant.

② The blue pigment dispersion prepared by the following method

Phthalocyanine Blue and a styrene-acrylic copolymer (trade name "Johncryl J683", product of Johnson Polymer) were blended in a ratio of 5:1 (by weight) and triethanolamine and water were added for dissolution. The mixture was dispersed using a beads mill to give a pigment dispersion with a mean particle diameter of 0.25 µm and a nonvolatile fraction of 10%. This pigment dispersion was used as the colorant.

(3) Thixotropic agent
① Welan gum: trade name "K1C376", product of Sansho)
② Succinoglycan: trade name "Rheozan", product of Sansho)
(4) Water-Soluble Resin
① Acrylic resin emulsion: trade name "Nikasol FX336", product of Nippon Carbide Industries. Co., anionic, pH 7.5, MFT≦0° C.
② Polyvinyl alcohol: trade name Kuraray Poval PVA-203", product of Kuraray Co., purity 94%, degree of saponification 86.5~89.5 mol %
(5) Water-Soluble Organic Solvent
① Glycerin: reagent
② Propylene glycol: reagent
(6) Lubricant
① POE-alkyl ether phosphate: trade name "Phosphanol PE-510", product of Toho Chemical Industry, phosphoric ester activator (anionic surfactant)
(7) Antifungal Preservative
① 1,2-Benzoisothiazolin-3-one: trade name "Proxel GXL", product of Hoechst Gosei.
(8) Rust Inhibitor
① Benzotriazole: reagent Test Example 3.1

The writing properties of the ink compositions obtained in Examples and Comparative Examples were organoleptically evaluated.

First, a ball-point pen was assembled using each ink composition. The ink composition was filled into the ink housing comprising a hollow translucent polypropylene shaft equipped with a stainless steel ball-point-pen tip (ball: silicon carbide; ball diameter: 0.8 mm) at one end to complete a ball-point pen.

Using the above ball-point pen, a line was drawn on commercial loose-leaf paper and a panel test was carried out to evaluate the writing properties. The case in which smooth writing was possible was rated "○", while the case in which no smooth writing was possible but omissions (breaks in the line) occurred was rated "x". The results are shown in Table 3-1.

Examples of Fourth Invention

Examples 4.1~4.5

According to the formulations shown in Table 4-1, water and the white pigment (boron nitride powder or aluminum powder) were admixed and dispersed using a Dissolver for 30 minutes. Then, the remaining components were added and the whole mixtures were respectively stirred for 1 hour to prepare ink compositions (water-based ink compositions).

Comparative Examples 4.1~4.4

The components indicated in Table 1 ware uniformly admixed using a Dissolver to give water-based ink compositions.

TABLE 4-1

| | White ink | | | | | |
|---|---|---|---|---|---|---|
| | Example | | | | Comparative Example | |
| Formulation | 4.1 | 4.2 | 4.3 | 4.4 | 4.1 | 4.2 |
| Boron nitride powder | 15.0 | 25.0 | | | | |
| Alumina powder | | | 15.0 | 25.0 | | |
| Titanium dioxide dispersion | | | | | 35.0 | |
| White resin bead dispersion | | | | | | 40.0 |
| Red pigment dispersion | | | | | | |
| Fluorescent yellow pigment dispersion | | | | | | |
| Glycerin | 8.0 | 8.0 | 8.0 | 8.0 | 8.0 | 8.0 |
| Preservative | 0.5 | 0.5 | 0.5 | 0.5 | 0.5 | 0.5 |
| Viscosity modifier | 25.0 | 25.0 | 25.0 | 25.0 | 25.0 | 25.0 |
| Lubricant | 10.0 | 10.0 | 10.0 | 10.0 | 10.0 | 10.0 |
| Deionized water | 41.5 | 31.5 | 41.5 | 31.5 | 21.5 | 16.5 |
| Total | 100.0 | 100.0 | 100.0 | 100.0 | 100.0 | 100.0 |
| Result | | | | | | |
| L value (on black drawing paper) | 85.8 | 87.8 | 77.4 | 87.4 | 71.6 | 64.1 |
| Sharpness of drawn line | ○ | ○ | ○ | ○ | X | X |
| Sink of ball (µm) | 8.0 | 9.0 | 8.0 | 10.0 | 36.0 | 9.0 |

| | Pastel red ink | |
|---|---|---|
| Formulation | Example 4.5 | Compar. Ex. 4.3 |
| Boron nitride powder | 15.0 | |
| Alumina powder | | |
| Titanium dioxide dispersion | | 25.0 |
| White resin bead dispersion | | |
| Red pigment dispersion | 4.0 | 4.0 |
| Fluorescent yellow pigment dispersion | | |
| Glycerin | 8.0 | 8.0 |
| Preservative | 0.5 | 0.5 |
| Viscosity modifier | 25.0 | 25.0 |
| Lubricant | 10.0 | 10.0 |
| Deionized water | 37.5 | 27.5 |
| Total | 100.0 | 100.0 |
| Result | | |
| L value (on black drawing paper) | 56.5 | 53.6 |
| Sharpness of drawn line | ○ | X |
| Sink of ball (µm) | 9.0 | 32.0 |

TABLE 4-1-continued

Pastel fluorescent yellow ink

| Formulation | Example 4.6 | Compar. Ex. 4.4 |
|---|---|---|
| Boron nitride powder | | |
| Alumina powder | 10.0 | |
| Titanium dioxide dispersion | | |
| White resin bead dispersion | | 30.0 |
| Red pigment dispersion | | |
| Fluorescent yellow pigment dispersion | 16.0 | 16.0 |
| Glycerin | 8.0 | 8.0 |
| Preservative | 0.5 | 0.5 |
| Viscosity modifier | 25.0 | 25.0 |
| Lubricant | 10.0 | 10.0 |
| Deionized water | 30.5 | 10.5 |
| Total | 100.0 | 100.0 |
| Result | | |
| L value (on black drawing paper) | 70.6 | 55.0 |
| Sharpness of drawn line | ○ | X |
| Sink of ball (μm) | 11.0 | 11.0 |

In Table 4-1, Examples 4.1~4.4 and Comparative Examples 4.1~4.2 correspond to white inks; Example 4.5 and Comparative Example 4.3 correspond to pastel red inks; and Example 4.6 and Comparative Example 4.4 correspond to pastel yellow inks. As the components shown in Table-1, the following products were used.

(1) Scaly White Pigment

① α-Alumina powder: trade name "Seraf YFA02050", product of YKK, mean particle dia. 1~2 μm, aspect ratio 45~55

② Boron nitride powder: trade name "Sho BN UHP-S1", product of Showa Denko K.K., mean particle diameter 1~2 μm.

(2) Titanium Dioxide Dispersion

The dispersion obtained by dissolving 3.3 weight parts of a styrene-acrylic resin (trade name "Johncryl 690", product of Johnson Polymer) and 0.6 weight % of sodium hydroxide in 31.5 weight % of deionized water under heating, adding 55.0 weight % of titanium dioxide (trade name "KR-380N", product of Titanium Industry), and stirring the whole using a beads mill for 5 minutes was used as the titanium dioxide dispersion.

(3) White Resin Bead Dispersion

Commercial product: trade name "Muticle PP240D", product of Mitsui Toatsu Chemicals, Inc.

(4) Red Pigment Dispersion

The dispersion obtained by dissolving 4.0 weight parts of a styrene-acrylic resin (trade name "Johncryl 683", product of Johnson Polymer) and 0.4 weight % of sodium hydroxide in 26.5 weight % of deionized water under heating, adding 20.0 weight % of red pigment (trade name "Shimura Fast Red 4127", product of Dainippon Ink and Chemicals, Inc.), and stirring the whole using a beads mill for 20 minutes was used as the red pigment dispersion.

(5) Fluorescent Yellow Pigment Dispersion

Commercial product "Lumikol NKW-C2105", product of Nippon Fluorescence Co.

(6) Others

① Glycerin: reagent

② Preservative: trade name "Proxel XL-2", product of Abisia, 1,2-benzoisothiazolin-3-one ③ Viscosity modifier: Welan gum (trade name "K1C376", product of Sansho), 1 weight % aq. sol.

④ Lubricant: POE alkyl ether phosphate: trade name "Phosphanol PE-510", product of Toho Chemical Industry, a phosphoric ester activator (surfactant), 10 weight % aq. sol.

Test Example 4.1

The characteristics of the water-based ink compositions obtained in Examples and Comparative Examples were investigated.

First, a ball-point pen was fabricated using each ink composition. Thus, the ink composition was filled into the ink housing comprising a hollow translucent polypropylene shaft equipped with a stainless steel ball-point-pen tip (ball: silicon carbide; ball diameter: 0.8 mm) at one end to complete a ball-point pen. The results are shown in Table 4-1. Each test was performed according to the following protocol.

1) L Value on Black Drawing Paper

Using a 20 μm-thick bar coater, each ink composition was coated on black drawing paper and the L value of the coating layer was measured with a color difference meter. It is understood that the higher the L value is, the higher is the opacifying (hiding) power of the ink.

2) Sharpness of the Drawn Line

Using the ball-point pen, a line was drawn on black drawing paper and the drawn line was visually evaluated. The mark "○" indicates a sharp drawn line, while the mark "x" indicates a smudged line.

3) Sinking of the Ball

The above ball-point pen was tested with a "MODEL TS-4C-10" spiral continuous writing test machine (manufactured by Seiki Kogyo Co.) and the amount of sink of the ball at the tip of the ball-point pen after 300 m of writing was measured. The test conditions were: writing angle: 65°; load: 100 g, writing speed: 7 cm/min.

What is claimed is:

1. A water-based writing ink composition comprising:
   water;
   inorganic particles 1) comprise titanium dioxide and have a surface conversion layer, 2) contain at least one of Al, Si, Zn or Zr and 3) have an Al/(Al+Si+Zn+Zr) weight ratio of not greater than 0.5; and
   a water-soluble polymer for dispersion stability.

2. The water-based writing ink composition according to claim 1, wherein the content of the water-soluble polymer is 0.1~3 weight %.

3. A water-based writing ink composition comprising:
   water;
   inorganic particles which are scaly particles of at least one kind selected from the group consisting of scaly alumina particles and scaly boron nitride particles; and
   a water-soluble polymer for dispersion stability.

4. The water-based writing ink composition according to claim 3 which contains no colorant other than the scaly particles.

5. A water-based writing ink composition comprising:
   water;
   inorganic particles which are scaly alumina;
   a colorant;
   a water-soluble organic solvent; and
   a water-soluble polymer for dispersion stability.

6. The water-based writing ink composition according to claim 5 wherein the aspect ratio of the scaly alumina is not less than 5.

7. A water-based ink composition comprising:
water;
inorganic particles which are scaly alumina;
a colorant;
a water-soluble organic solvent; and
a water-soluble polymer for dispersion stability,
wherein the aspect ratio of the scaly alumina is not less than 5 and the colorant comprises a colored resin bead dispersion.

8. A water-based writing ink composition comprising:
water;
inorganic particles comprised of a white scaly pigment which is at least one white scaly pigment selected from the group consisting of boron nitride and alumina flakes;
a water-soluble polymer for dispersion stability; and
a water-soluble organic solvent.

9. A writing instrument comprising a water-based writing ink composition, wherein the composition comprises:
water;
inorganic particles 1) comprise titanium dioxide and have a surface conversion layer, 2) contain at least one of Al, Si, Zn or Zr, and 3) have an Al/(Al+Si+Zn+Zr) weight ratio of not greater than 0.5; and
a water-soluble polymer for dispersion stability.

10. The writing instrument according to claim 9, wherein the content of the water-soluble polymer is 0.1~3 weight %.

11. A writing instrument comprising a water-based writing ink composition, wherein the composition comprises:
water;
inorganic particles which are scaly of at least one kind selected from the group consisting of scaly alumina particles and scaly boron nitride particles; and
a water-soluble polymer for dispersion stability.

12. The writing instrument according to claim 11 which contains no colorant other than the scaly particles.

13. A writing instrument comprising a water-based writing ink composition, wherein the composition comprises:
water;
inorganic particles which are scaly alumina;
a colorant;
a water-soluble organic solvent; and
a water-soluble polymer for dispersion stability.

14. The writing instrument according to claim 13, wherein the aspect ratio of the scaly alumina is not less than 5.

15. The writing instrument according to claim 13, wherein the colorant comprises a colored resin bead dispersion.

16. A writing instrument comprising a water-based writing ink composition, wherein the composition comprises:
water;
inorganic particles comprised of a white scaly pigment which is at least one white scaly pigment selected from the group consisting of boron nitride and alumina flakes;
a water-soluble polymer for dispersion stability; and
a water-soluble organic solvent.

* * * * *